3,252,783
METHOD OF CONTROLLING PLANT GROWTH
Jack S. Newcomer, Wilson, Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed Mar. 2, 1964, Ser. No. 348,767
23 Claims. (Cl. 71—2.3)

This application is a continuation-in-part of Serial Number 791,015, filed February 4, 1959, now U.S. Patent Number 3,006,967 and Serial Number 102,099, filed April 11, 1961, now abandoned.

This invention relates to a method of controlling the growth of undesirable vegetation by the application of certain herbicidal compositions of matter known as the trichlorinated phenylalkoxyalkanols. More particularly, this invention describes a process for the control and eradication of certain troublesome weeds, by the pre- and post-emergence application of compositions having the structure:

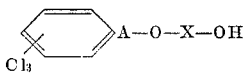

wherein A is an alkylene radical of 1 to 2 carbon atoms, and X is a radical chosen from the group consisting of alkylene, alkylene-oxyalkylene, and hydroxyalkylene radicals having from two to six carbon atoms inclusive. Among the many representative compositions of matter contemplated to be within the scope of the inventive method are the 2,3,6- and various other trichlorobenzyloxy and trichlorophenylethoxyethanols, propanols, butanols, pentanols and hexanols and, where such substitutions are possible, their mono-, di- and tri-lower alkyl, hydroxy and oxa substituted analogs. While the above compounds function satisfactorily as herbicides in the method of this invention, some compounds will, by nature of their different characteristics, be superior to others. The inventors have found that this narrower superior class of herbicides comprises mixtures of the trichlorinated benzyloxy alkanols, and their monooxa and monohydroxyl-substituted analogs, wherein at least 30% of the trichlorobenzyl groups have the 2,3,6-configuration. For a number of reasons, the preferred embodiment within the narrower superior class is made up of those isomer mixtures containing at least 30% of either the 2,3,6-trichlorobenzyloxyethanol or propanol. Where A is methylene, the compositions used in the novel method of this invention are low melting waxy solids or liquids which may be prepared by the chlorination of toluene or ortho-chlorotoluene, or less conveniently, 2,6-dichlorotoluene, 2,5-dichlorotoluene, 2,3-dichlorotoluene or a mixture thereof, to the point where three chlorines are present on the aromatic ring and one chlorine is introduced in the side chain. Where A is ethylene, the next higher homologs of the above-named starting materials are used. The reaction product which consists of a mixture containing at least 30% of the 2,3,6-trichloro isomer is reacted with a molar excess of a compound of the structure HO—X—OH in the presence of an acid acceptor, X being an alkylene radical having from two to six carbon atoms. The preferred embodiment is where the isomeric mixture containing at least 30% 2,3,6-trichlorobenzyl chloride is reacted with a molar excess of either ethylene glycol or 1,2-propane diol. While the pure 2,3,6-trichlorobenzyloxyalkanols are highly active, there is little incentive to resolve these mixtures by the tedious and expensive separation procedures involved.

Under the conditions set forth above, an isomeric mixture of thirty to seventy percent 2,3,6-trichloro isomer is produced. Where a higher proportion of the 2,3,6-isomer is desired, the above mixture's 2,3,6 content may be enriched up to the one hundred percent level by utilizing the technique of Brimelow et al. disclosed in J. Chem. Soc., 1208–1212 (1951).

Among the obvious advantages of the present invention is that it offers a means of controlling weeds at two important stages of their growth, that is prior to their emergence and after they have emerged as seedlings. Thus, the inventive method offers more opportunity to control the weed population than is offered by those compositions which only lend themselves to pre- or post-emergence use alone.

An additional advantage of this inventive herbicidal method is that while the materials utilized possess high phytotoxicity toward weeds after emergence, they are selectively herbicidal and exhibit low phytotoxicity against certain crops, such as corn, sugar cane, grapes and turf grasses, thus enabling the grower to dispense with the more laborious and expensive machine and hand cultivating to remove the weed population competing with his crops.

While selectivity and low phytotoxicity toward broad-leaf crops are important attributes possessed by the present compositions, there are equally important additional advantages, some of which will be disclosed for the sake of illustration.

An additional advantage of the novel method of this invention is that it lends itself to the use of various grades of purity ranging from the highly purified oil or crystalline product to a technical crude. Furthermore, these herbicidal compositions offer the advantage of compatibility with a host of other herbicides including the tri- and tetrachlorophenylacetic acids, the sodium borates and calcium borates, 2,4-D and other herbicidal phenoxy aliphatic acids and esters, simazine and other herbicidal triazines, monuron, fenuron, diuron and other herbicidal ureas, herbicidal petroleum oils, hexachlorocyclopentadiene, pentachlorophenol, dinitro-o-alkylphenols, sodium trichloroacetate, and sodium 2,2-dichloropropionate, with fungicides such as the metal dimethyldithiocarbamates and ethylenebis-(dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations, ranging from the very simple to the most elegant. For example, if it is desired, these compositions may be made the subject of a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. Alternatively, the novel herbicides may be made up as solid formulations of powders, dusts, wettable dusts, granules and pellets, using solid diluents such as talcs, clays, flours, starches, diatomaceous earths, mica, alkaline earth limes, carbonates and phosphates either finely divided, granular or pelleted in form. These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. Within the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38 (67) 1955. Other sources of adjuvant materials are set forth in Bulletin E-607 of the Bureau of Entomology and Plant Quarantine of the United States Department of Agriculture.

While the manner and method of application of the mentioned compositions are varied and largely dependent upon the climatic conditions, crop treated, the weeds to be eradicated, the equipment available and the convenience of the user, a preferred embodiment of this invention is to apply these herbicides as a spray after making them up as a liquid formulation comprised of several times their weight of non-phytotoxic solvents, such as xylene, with small quantities of an emulsifier, such as a commercial polyoxyethylene ether and a surfactant, such as alkylaryl sulfonate mixture. This type of mixture is emulsified with water and sprayed on the weed population growing amidst the desired crop such as corn, sugar cane, grapes, turf grasses and so forth. Or alternatively, these compositions may be applied as a solid formulation directly to the ground.

The rate of application cannot be precisely stated due to varying degree of resistance possessed by the weed species and crop, the stage of weed and crop growth, the soil type and climatic conditions, but in general, the rates will be at least one-quarter of a pound of herbicide per acre and for reasons of cost will seldom exceed one hundred pounds per acre, with the preferred range falling within one-half to fifty pounds per acre. Where the weeds are in an early stage of growth, being more susceptible, they will frequently respond to the rates from one-half to four pounds per acre while older weeds or weeds that are to be totally eradicated from ornamental beds or turf may require rates in excess of four pounds per acre. In those instances where the weed population has been allowed to accumulate unchecked or where mature plants are encountered, applications of up to fifty pounds per acre and even more may be required. For eradication of deeply-rooted herbicide-resistant perennial weeds, such as field bindweed, rates of ten to one hundred pounds per acre are found best.

The following examples are intended to illustrate the workings of this invention including such related aspects as the preparation of the herbicidal compositions, their formulation as herbicidal agents, and the testing results obtained using representative compounds as herbicides. The details of certain embodiments either in the preceding specification or foregoing examples is not intended to place limitations upon the inventive method except as set forth in the claims. Parts are by weight and temperatures are expressed in degrees centigrade, unless otherwise indicated.

*Example 1*

This example shows the preparation and analysis of the compositions above described; the members of the X group in the formula given above are indicated in the first column of the table below.

Toluene was chlorinated at sixty to seventy degrees centigrade in the presence of 0.1 percent ferric chloride as a catalyst until the weight uptake indicated about 2.5 moles of chlorine had reacted. The product was distilled and the fraction boiling at one hundred and twenty to one hundred and forty degrees (twenty mm.), was taken. Analysis by infrared means indicated an isomer content of twenty-five to forty percent 2,4,5-, forty to fifty percent 2,3,6-, and ten to fifteen percent 2,3,4-trichlorotoluene. This trichlorotoluene was chlorinated at one hundred to two hundred degrees centigrade under irradiation by a mercury vapor lamp until 0.7 to 0.8 mole of hydrogen chloride per mole of trichlorotoluene was evolved. This product was fractionated to obtain the trichlorobenzyl chloride fraction, boiling point one hundred and thirty-one to one hundred and fifty-two degrees centigrade (six mm.). This trichlorobenzyl chloride was added with stirring to 1.5 molar equivalents of caustic soda in a molar excess of the chosen glycol, at one hundred and forty to one hundred and fifty degrees centigrade, and the reaction mixture was heated and stirred for about three hours. The mixture was then poured into water, exhaustively extracted with toluene, and the toluene extracts were combined and distilled under reduced pressure to obtain the desired product. Infrared analysis shows these products to have substantially the same isomer distribution as the trichlorotoluene intermediate.

TABLE

| Composition No. | Group —X— | Glycol Employed | Description of Product | Chlorine Analysis Calculated | Chlorine Analysis Found |
|---|---|---|---|---|---|
| 1a | —CH$_2$CH$_2$— | Ethylene glycol | Semi-solid, B.P. 181–192° (6 mm.) | 41.6 | 41.2 |
| 1b | —CH$_2$CH$_2$CH$_2$CH$_2$— | 1,4-butanediol | Viscous syrup, B.P. 140–168° (0.25 mm.) | 37.6 | 37.3 |
| 1c | —CH$_2$CH(CH$_3$)— | 1,2-propanediol | Viscous syrup, B.P. 140–168° (0.5 mm.) | 39.5 | 37.9 |
| 1d | —CH$_2$CHOHCH$_2$— | Glycerol | Very viscous syrup, decomp. on dist. | 37.5 | 39.3 |
| 1e | —CH$_2$CH$_2$OCH$_2$CH$_2$— | Diethylene glycol | Viscous syrup, B.P. 175–185° (0.05 mm.) | 35.5 | 34.0 |
| 1f | —CHCH(CH$_3$)OCH$_2$CH(CH$_3$)— | Dipropylene glycol | Viscous syrup, B.P. 180–185° (0.05 mm.) | 32.5 | 32.7 |
| 1g | —CH(CH$_3$)CH(CH$_3$)— | 2,3-butanediol | Viscous syrup, B.P. 170–176° (5 mm.) | 37.7 | 42.0 |
| 1h | —CH$_2$CH$_2$CH(CH$_3$)— | 1,3-butanediol | Viscous syrup, B.P. 171–182° (5 mm.) | 37.7 | 37.3 |
| 1i | —(CH$_2$CH$_2$O)$_2$CH$_2$CH$_2$— | Triethylene glycol | Viscous syrup, B.P. 210–250° (0.38 mm.) | 31.0 | 28.8 |
| 1j | —CH$_2$CH$_2$—ᵃ | Ethylene glycol | Semi-solid, B.P. 175–190° (5 mm.) | 41.6 | 41.0 |
| 1k | —CH$_2$CH(CH$_3$)—ᵇ | 1,2-propanediol | Viscous semi-solid B.P. 145–160° (0.5 mm.) | 39.5 | 39.0 |

ᵃ As composition 1a but prepared from orthochlorotoluene.
ᵇ As composition 1e but prepared from orthochlorotoluene.
Infrared analysis of 1j and 1k shows sixty to seventy percent 2,3,6-isomer and thirty to forty percent 2,4,5-isomer.

*Example 2.—Preparation of 2-(2,3,6-trichlorobenzyloxy)ethanol*

2,3,6-trichlorotoluene prepared by the method of Brimelow, Jones and Metcalf (J. Chem. Soc., 1951, 1208), is chlorinated at one hundred to one hundred and twenty degrees centigrade under irradiation by a mercury vapor lamp until 0.7 to 0.8 mole of hydrogen chloride per mole of the toluene is evolved. The resultant 2,3,6-trichlorobenzyl chloride, boiling point one hundred and fifty to one hundred and fifty-five degrees centigrade (eighteen mm.), is separated from unreacted 2,3,6-trichlorotoluene by fractionation. A solution of forty-four parts of caustic soda in two hundred and fifty parts of ethylene glycol is prepared by warming to one hundred and eighty-five degrees centigrade, followed by cooling to one hundred and forty-five degrees centigrade, and adding one hundred and fifteen parts of 2,3,6-trichlorobenzyl chloride. After three hours at one hundred and forty-five to one hundred and fifty degrees centigrade, the reaction mixture is mixed with two thousand parts of water and one thousand parts of toluene, the toluene layer is then separated and fractionated, yielding sixty-five parts of 2-(2,3,6-trichlorobenzyloxy)ethanol, boiling point one hundred and eighty-one to one hundred and ninety-two degrees centigrade (six mm.).

*Chlorine analysis.*—Calculated for C$_9$H$_9$Cl$_3$O$_2$: 41.6 percent. Found: 41.2 percent.

Example 3

By the method of the foregoing example, 2,3,6-trichlorobenzyl chloride is reacted with propylene glycol, to obtain a colorless liquid boiling at one hundred and eight degrees centigrade (0.05 mm.).

Chlorine analysis.—Calculated for $C_{10}H_{11}Cl_3O_2$: 39.5 percent. Found: 39.2 percent.

Example 4

The method of Example 2 was used, except that the starting material was 2,4,5-trichlorotoluene. The product was a waxy solid, boiling point one hundred and fifty-five to one hundred and sixty-two degrees centigrade (0.75 mm.).

The use of the compounds described as herbicides is illustrated by the following examples.

Example 5

An area infested with the seeds of annual broadleaf weeds (principally ragweed, pigweed and lamb's-quarters), and annual broadleaf grasses (principally crabgrass and witchgrass) was plowed, disced, marked into test plots, and seeded with corn, following which the plots were sprayed with various test chemicals at four pounds per acre. One month later the plots were inspected for weed control and crop damage.

| Chemical | Percent Control Broadleaf Weeds | Grasses | Corn Injury |
| --- | --- | --- | --- |
| 2,3,6-trichlorobenzyloxyethanol | 100 | 100 | Nil. |
| 2,4,5-trichlorobenzyloxyethanol | 5 | 5 | Trace. |
| Composition of Ex. 1a (40-50% 2,3,6-, 25-40% 2,4,5-, remainder principally 2,3,4- and 2,4,6-trichlorobenzyloxyethanol). | 95 | 95 | Slight. |
| Composition of Ex. 1j (60-70% 2,3,6-, and 30-40% 2,4,5-trichlorobenzyloxyethanol). | 100 | 100 | Trace. |
| 2,3,6-trichlorobenzyloxypropanol | 100 | 100 | Nil. |
| 2,4,5-trichlorobenzyloxypropanol | 5 | 5 | Trace. |
| Composition of Ex. 1c (40-50% 2,3,6-, 25-40% 2,4,5-, remainder principally 2,3,4- and 2,4,6-trichlorobenzyloxypropanol. | 95 | 95 | Trace. |
| Composition of Ex. 1k (60-70% 2,3,6- and 30-40% 2,4,5-trichlorobenzyloxypropanol. | 100 | 100 | Trace. |
| 2,4,-dichlorophenoxyacetic acid (2,4-D). | 100 | 0-10 | Trace. |
| N,N-diallyl-α-chloroacetamide (Randox). | 0-10 | 100 | Nil. |
| Untreated plots | 0 | 0 | |

Example 6

An area infested with well established field bindweed (*Convolvulus arvensis*), was divided into plots and sprayed in early spring with emulsions of the test chemicals at the rates indicated. In the following autumn, the plots were inspected and the control of bindweed was estimated, relative to untreated control plots.

| Compound from Example 1 | Control of Field Bindweed at Rates Indicated [a] | |
| --- | --- | --- |
| | 24 lbs./acre | 48 lbs./acre |
| 1a | 6-8 | 9-10 |
| 1b | 2-3 | 5 |
| 1c | 9-10 | 10 |
| 1d | 9 | 9 |
| 1e | 2-3 | 5 |
| 1f | 2-3 | 5 |
| 1g | 5 | 10 |
| 1h | 2-3 | 5 |
| 1i | 2-3 | 5 |
| 1j | 7-9 | 9-10 |
| 1k | 9-10 | 9-10 |

[a] Scale: 0=no effect; 1 to 3=slight repression; 4-5=moderate repression, regrowth probable; 6-8=substantial repression, regrowth doubtful; 9=almost complete eradication, no regrowth expected; 10=complete eradication, no viable shoots.

One year after treatment, sorghum, wheat and rye could be planted into the above twenty-four pound per acre plots without serious damage to the seedlings by the residual herbicide.

Example 7

The test area employed was infested with the following established perennial and biennial weeds: bindweed, plantain, wild carrot, Canada thistle, yarrow, daisy, milkweed and quackgrass. Trichlorobenzyloxyethanol (made by chlorination of toluene, as described in Example 1), is applied at the rate of eighty pounds per acre in the early summer. One year later, the treated area was completely bare of living vegetation, indicating that one hundred percent soil sterilization had been accomplished.

Example 8

An area infested with quackgrass (*Agropyron repens*), is sprayed in early spring with a logarithonic sprayer, in prepared parallel plots in which the rates of chemical applied ranged from eight pounds per acre to one pound per acre. Two weeks later, the sprayed areas, as well as unsprayed control areas, were plowed, disced and planted with field corn.

Greater than fifty percent control of quackgrass was noted after six weeks in the areas sprayed at three to eight pounds per acre of 2,3,6-trichlorobenzyloxyethanol and 2,3,6-trichlorobenzyloxypropanol. Corn damage was nil in this range of rates.

It is to be understood that throughout this application the term alkylene-oxy-akylene refers to an alkylene radical wherein at least one methylene group (and if more than one, no adjacent methylene groups), has been replaced by an oxygen atom, as for example, $$CH_2CH_2OCH_2CH_2 \text{ and } CH_2CH_2OCH_2CH_2OCH_2CH_2$$

None of the specific embodiments used in the description of this invention shall be considered as limitations upon the scope of the invention except as included in the accompanying claims. Modifications may be made and equivalents may be substituted for elements of the invention without going beyond the purview of the claims, it being intended that the invention should be given a broad construction.

What is claimed is:

1. The method of controlling weeds which comprises applying a phytotoxic amount of a trichlorinated phenylalkoxyalkanol having the structural formula:

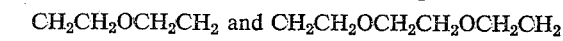

wherein A is an alkylene radical of one to two carbon atoms, and X is an organic radical selected from the group consisting of alkylene, alkylene-oxy-alkylene, and hydroxyalkylene radicals having from two to six carbons atoms inclusive.

2. The method according to claim 1 wherein X is an alkylene radical.

3. The method according to claim 1 wherein X is an alkylene-oxy-alkylene radical.

4. The method according to claim 1 wherein X is a hydroxyalkylene radical.

5. The method of claim 1 wherein the compound applied is a trichlorobenzyloxyethanol.

6. The method of claim 1 wherein the compound applied is a trichlorobenzyloxypropanol.

7. The method of claim 6 wherein at least thirty percent of the trichlorobenzyloxypropanol applied is 2,3,6-trichlorobenzyloxypropanol.

8. The method of claim 1 wherein the compound applied is a trichlorobenzyloxybutanol.

9. The method of claim 1 wherein the compound applied is a trichlorobenzyloxypentanol.

10. The method of claim 1 wherein the compound applied is a trichlorobenzyloxyhexanol.

11. The method of claim 1 wherein the compound applied is a 3-(trichlorobenzyloxy) propane-1,2-diol.

12. The method of claim 1 wherein the compound applied is a trichlorobenzyloxyethoxyethanol.

13. The method of claim 1 wherein the compound applied is a trichlorobenzyloxypropoxypropanol.

14. The method of claim 1 wherein the compound applied is [2-(2,3,6-trichlorophenyl) ethoxy]ethanol.

15. The method of claim 1 wherein the compound applied is [2-(2,3,6-trichlorophenyl) ethoxy]propanol.

16. The method of claim 1 wherein the compound applied is [1-(2,3,6-trichlorophenyl)ethoxy]ethanol.

17. The method of claim 1 wherein the compound applied is [1-(2,3,6-trichlorophenylethoxy]propanol.

18. A method for controlling weeds which comprises applying to the locus of the weeds to be treated a phytotoxic amount of a composition comprising trichlorinated phenyl alkoxy alkanol of the structural formula:

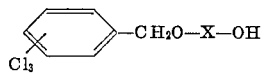

where X is a radical selected from the group consisting of alkylene, alkylene-oxy-alkylene, and hydroxyalkylene radicals having from two to six carbon atoms inclusive, and produced by the process of chlorinating a halogenated aromatic compound selected from the group consisting of toluene, orthochlorotoluene, 2,6-dichlorotoluene, 2,5-dichlorotoluene, 2,3-dichlorotoluene, and mixtures thereof, until an average total of about three chlorine atoms is present on the aromatic ring and one chlorine atom is introduced in the side chain, to thereby produce a trichlorobenzyl chloride material, followed by reacting the said trichlorobenzyl chloride material with a molar excess of a compound of the formula:

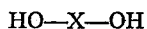

where X is as defined above.

19. A method of controlling weeds which comprises applying a phytotoxic amount of a trichlorinated phenylalkoxyalkanol having the structural formula:

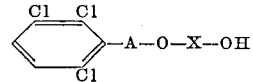

wherein A is an alkylene radical of one to two carbon atoms, and X is an organic radical selected from the group consisting of alkylene, alkylene-oxy-alkylene, and hydroxyalkylene radicals having from two to six carbon atoms inclusive.

20. The method according to claim 19 wherein X is a lower alkylene radical.

21. The method according to claim 20 wherein A is methylene.

22. The method of claim 21 wherein the compound applied is 2,3,6-trichlorobenzyloxyethanol.

23. The method of claim 21 wherein the compound applied is 2,3,6-trichlorobenzyloxypropanol.

References Cited by the Examiner
UNITED STATES PATENTS

| | | | |
|---|---|---|---|
| 3,006,967 | 10/1961 | Newcomer et al. | 71—2.3 |
| 3,107,933 | 10/1963 | Schaeffer et al. | 71—2.3 |

LEWIS GOTTS, *Primary Examiner.*

J. O. THOMAS, *Assistant Examiner.*

UNITED STATES PATENT OFFICE
CERTIFICATE OF CORRECTION

Patent No. 3,252,783                             May 24, 1966

Jack S. Newcomer et al.

It is hereby certified that error appears in the above numbered patent requiring correction and that the said Letters Patent should read as corrected below.

Column 7, line 14, for "[1-(2,3,6-trichlorophenylethoxy]propanol" read -- [1-(2,3,6-trichlorophenyl)ethoxy]propanol --.

Signed and sealed this 10th day of October 1967.

(SEAL)
Attest:

Edward M. Fletcher, Jr.
Attesting Officer

EDWARD J. BRENNER
Commissioner of Patents